United States Patent
Choi et al.

(10) Patent No.: US 11,469,044 B2
(45) Date of Patent: *Oct. 11, 2022

(54) CAPACITOR COMPONENT

(71) Applicant: SAMSUNG ELECTRO-MECHANICS CO., LTD., Suwon-si (KR)

(72) Inventors: Du Won Choi, Suwon-si (KR); Ji Hong Jo, Suwon-si (KR); Seok Kyoon Woo, Suwon-si (KR); Hae Suk Chung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 78 days.

This patent is subject to a terminal disclaimer.

(21) Appl. No.: 17/015,807

(22) Filed: Sep. 9, 2020

(65) Prior Publication Data
US 2020/0411238 A1  Dec. 31, 2020

Related U.S. Application Data

(63) Continuation of application No. 16/293,286, filed on Mar. 5, 2019, now Pat. No. 10,796,851.

(30) Foreign Application Priority Data

Nov. 29, 2018 (KR) .................. 10-2018-0151034

(51) Int. Cl.
*H01G 4/12* (2006.01)
*H01G 4/30* (2006.01)
(Continued)

(52) U.S. Cl.
CPC .............. *H01G 4/12* (2013.01); *H01G 4/008* (2013.01); *H01G 4/012* (2013.01); *H01G 4/248* (2013.01); *H01G 4/30* (2013.01)

(58) Field of Classification Search
CPC ........ H01G 4/012; H01G 4/1227; H01G 4/33; H01G 4/248; H01G 4/0085; H01G 4/232; H01G 4/30; H01G 4/008; H01G 4/12
See application file for complete search history.

(56) References Cited

U.S. PATENT DOCUMENTS

| 10,403,436 B2 | 9/2019 | Shin et al. |
| 2013/0038982 A1* | 2/2013 | Lee .................. H01G 4/005 |
| | | 427/79 |

(Continued)

FOREIGN PATENT DOCUMENTS

| CN | 103124706 A | 5/2013 |
| CN | 108206090 A | 6/2018 |

(Continued)

OTHER PUBLICATIONS

Notice of Allowance issued in corresponding U.S. Appl. No. 16/293,286 dated Jun. 8, 2020.

(Continued)

*Primary Examiner* — Michael P McFadden
(74) *Attorney, Agent, or Firm* — Morgan, Lewis & Bockius LLP

(57) ABSTRACT

A capacitor component includes a body including a plurality of dielectric layers and first and second internal electrodes, alternately disposed to face each other with respective dielectric layers interposed therebetween, and first and second external electrodes disposed on external surfaces of the body and connected to the first and second internal electrodes, respectively. The body includes a capacitance forming portion, in which capacitance is formed by including the first and second internal electrodes, cover portions disposed above and below the capacitance forming portion, respectively, and margin portions disposed on both side surfaces of the capacitance forming portion, respectively. At least one (Continued)

selected from the cover portions and the margin portions includes a plurality of graphene platelets.

18 Claims, 8 Drawing Sheets

(51) Int. Cl.
*H01G 4/008* (2006.01)
*H01G 4/012* (2006.01)
*H01G 4/248* (2006.01)

(56) References Cited

U.S. PATENT DOCUMENTS

| | | | |
|---|---|---|---|
| 2013/0194718 A1 | 8/2013 | Matsuda | |
| 2016/0005552 A1* | 1/2016 | Blum | H01G 11/56 429/7 |
| 2016/0093442 A1* | 3/2016 | Nagamoto | H01G 4/0085 361/301.4 |
| 2018/0174756 A1* | 6/2018 | Shin | H01G 4/30 |
| 2019/0333699 A1 | 10/2019 | Lee et al. | |

FOREIGN PATENT DOCUMENTS

| | | |
|---|---|---|
| CN | 110415973 A | 11/2019 |
| JP | 2014-220324 A | 11/2014 |
| JP | 2014-241453 A | 12/2014 |
| KR | 10-2018-0071039 A | 6/2018 |

OTHER PUBLICATIONS

Chinese Office Action dated May 31, 2022, issued in corresponding Chinese Patent Application No. 201910393320.0 (with English translation).

* cited by examiner

CAPACITOR COMPONENT

CROSS-REFERENCE TO RELATED APPLICATION(S)

This application is the continuation application of U.S. patent application Ser. No. 16/293,286 filed on Mar. 5, 2019, which claims benefit of priority to Korean Patent Application No. 10-2018-0151034 filed on Nov. 29, 2018 in the Korean Intellectual Property Office, the disclosures of which are incorporated herein by reference in their entirety.

BACKGROUND

1. Field

The present disclosure relates to a capacitor component.

2. Description of Related Art

A multilayer ceramic capacitor (MLCC) is a chip-type condenser commonly mounted on printed circuit boards of a variety of electronic products such as an image display devices, including liquid crystal displays (LCD) and plasma display panels (PDP), computers, smartphones, cellular phones, and the like, serving to charge and discharge electricity.

Such a multilayer ceramic capacitor (MLCC) may also be used as a component of various electronic devices, due to advantages thereof such as compactness, guaranteed high capacitance, and ease of mountability. With the trend for miniaturization and high output of various electronic devices such as a computer and a mobile device, and the like, there is an increasing need for miniaturization and high capacitance in a multilayer ceramic capacitor.

In addition, as an industrial interest in electrical components is increasing recently, research into multilayer ceramic capacitors (MLCCs) has been conducted to optimize MLCCs for automobiles or infotainment systems. As compared to MLCCs for information technology (IT) devices, MLCCs for electrical components may be used in relatively harsh environments having a high risk of human injury. Accordingly, there is a need for MLCCs having high-reliability and high-strength characteristics.

SUMMARY

An aspect of the present disclosure is to provide a capacitor component having high-strength characteristics.

According to an aspect of the present disclosure, a capacitor component includes a body including a plurality of dielectric layers and first and second internal electrodes, alternately disposed to face each other with respective dielectric layers interposed therebetween, the body having first and second surfaces, disposed to oppose each other, third and fourth surfaces, connected to the first and second surfaces and disposed to oppose each other, and fifth and sixth surfaces connected to the first to fourth surfaces and disposed to oppose each other. The capacitor component further includes first and second external electrodes disposed on external surfaces of the body and connected to the first and second internal electrodes, respectively. The body includes a capacitance forming portion, in which capacitance is formed by including the first and second internal electrodes disposed to face each other with respective dielectric layers interposed therebetween, cover portions disposed above and below the capacitance forming portion in a stacking direction of the first and second internal electrodes, and margin portions disposed on opposite sides of the capacitance forming portion. At least one selected from the cover portions and the margin portions includes a plurality of graphene platelets.

The capacitance forming portion may not include graphene.

The capacitance forming portion may have a lower graphene content than the at least one selected from the cover portions and the margin portions.

The at least one selected from the cover portion and the margin portions may include a plurality of dielectric grains and grain boundaries disposed between adjacent dielectric grains, and the plurality of graphene platelets may be disposed in the grain boundaries.

The graphene platelets may have one surface disposed along surfaces of the plurality of dielectric grains.

Among the plurality of graphene platelets, 5 percent or less of the total graphene platelets may be in a laminated state with 10 or more laminated layers of graphene.

The content of the plurality of graphene platelets in the at least one selected from the cover portions and the margin portions may be 0.05 weight percentage or more to less than 2.0 weight percentage, compared with barium titanate ($BaTiO_3$) contained in the at least one selected from the cover portions and the margin portions.

The at least one selected from the cover portions and the margin portions may have peaks in a Raman analysis detected in each of a D-band and a G-band.

The capacitance forming portion may have a peak in a Raman analysis which is detected in only one from among a D-band and a G-band.

Some of the plurality of graphene platelets may be a graphene oxide or a reduced graphene oxide.

Each of the first and second internal electrodes may have a thickness less than 1 micrometer, and each of the dielectric layers may have a thickness less than 2.8 micrometers.

When a thickness of each of the internal electrodes is defined as te and a thickness of each of the dielectric layers is defined as td, te and td satisfy td>2*te.

Each of the first and second external electrodes may include an electrode layer and a conductive resin layer disposed on the electrode layer.

The electrode layer may include a glass and a conductive metal including at least one selected from the group consisting of copper (Cu), silver (Ag), nickel (Ni), and alloys thereof.

The conductive resin layer may include a base resin and a conductive metal including at least one selected from the group consisting of copper (Cu), silver (Ag), nickel (Ni), and alloys thereof.

The first external electrode may be disposed on the third surface and includes a band portion extending onto portions of the first and second surfaces. A distance from the third surface to an end of the band portion of the electrode layer may be shorter than a distance from the third surface to an end of the band portion of the conductive resin layer.

According to an aspect of the present disclosure, a capacitor component includes a body including a plurality of dielectric layers and first and second internal electrodes, alternately disposed to face each other with respective dielectric layers interposed therebetween, the body having first and second surfaces, disposed to oppose each other, third and fourth surfaces, connected to the first and second surfaces and disposed to oppose each other, and fifth and sixth surfaces connected to the first to fourth surfaces and disposed to oppose each other, and first and second external electrodes disposed on external surfaces of the body and connected to the first and second internal electrodes, respectively. The body includes a capacitance forming portion, in which capacitance is formed by including the first and second internal electrodes disposed to face each other with respective dielectric layers interposed therebetween, cover portions disposed above and below the capacitance forming portion in a stacking direction of the first and second internal electrodes, and margin portions disposed on opposite sides of the capacitance forming portion. At least one selected from the cover portions and the margin portions has peaks detected in each of a D-band and a G-band in Raman analysis.

The capacitance forming portion may have a peak which is detected in only one from among the D-band and the G-band in Raman analysis.

The at least one selected from the cover portions and the margin portions may include a plurality of dielectric grains and a grain boundary formed between adjacent dielectric grains and the graphene boundary may have a peak detected in a Raman analysis in the D-band and the G-band.

The D-band may be at 1300 $cm^{-1}$ to 1400 $cm^{-1}$, and the G-band may be at 1500 $cm^{-1}$ to 1600 $cm^{-1}$.

The at least one selected from the cover portion and the margin portions may have a peak detected at 120 ppm to 140 ppm in a nuclear magnetic resonance (NMR) spectroscopy analysis.

The at least one selected from the cover portions and the margin portions may include a plurality of graphene platelets, and some of the plurality of graphene platelets may be a graphene oxide or a reduced graphene oxide.

Each of the first and second external electrodes may include an electrode layer and a conductive resin layer disposed on the electrode layer. The electrode layer may include a glass and a conductive metal including at least one selected from the group consisting of copper (Cu), silver (Ag), nickel (Ni), and alloys thereof. The conductive resin layer may include a base resin and a conductive metal including at least one selected from the group consisting of copper (Cu), silver (Ag), nickel (Ni), and alloys thereof.

According to an aspect of the present disclosure, a capacitor component includes a body including a dielectric, and pluralities of alternately stacked first and second internal electrodes disposed in the body and having dielectric layers therebetween. At least a portion of the body includes a plurality of graphene platelets, and a content of the graphene platelets in portions of the body outside of the dielectric layers disposed between the first and second internal electrodes is higher than a content of the graphene platelets in the dielectric layers disposed between the first and second internal electrodes.

The body may include an upper cover portion disposed above an uppermost internal electrode of the stacked first and second internal electrodes in a stacking direction of the first and second internal electrodes, a lower cover portion disposed below a lowermost internal electrode of the stacked first and second internal electrodes in the stacking direction, and side portions disposed between lateral edges of the first and second internal electrodes and side surfaces of the body. A content of the graphene platelets in at least one of the upper cover portion, the lower cover portion, and the side portions may be higher than a content of the graphene platelets in the dielectric layers disposed between the first and second internal electrodes.

The dielectric layers disposed between the stacked first and second internal electrodes may be free of graphene platelets at positions between the stacked first and second internal electrodes.

The content of graphene in portions of the body outside of the dielectric layers disposed between the first and second internal electrodes may be 0.05 weight percentage (wt %) or more to less than 2.0 wt % compared with barium titanate ($BaTiO_3$).

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
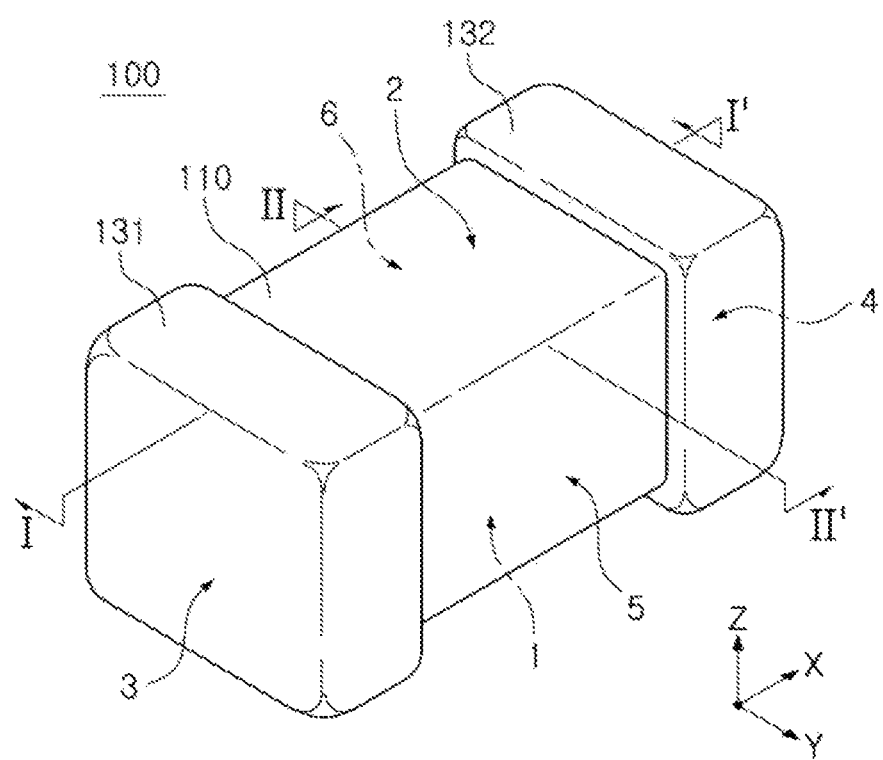
FIG. 1 is a perspective view of a capacitor component according to an exemplary embodiment in the present disclosure.

Hereinafter, embodiments in the present disclosure will be described in detail with reference to the accompanying drawings. The embodiments in the present disclosure may, however, be modified in many different forms, and accordingly, the scope of the present disclosure should not be construed as being limited to the embodiments set forth herein. Rather, these embodiments are shown and described to provide a thorough understanding to those skilled in the art. Accordingly, in the drawings, the shapes and dimensions of elements may be exaggerated for clarity, and the same reference numerals will be used throughout to designate the same or like elements.

Further, in the drawings, irrelevant descriptions will be omitted to clearly describe the present disclosure, and to clearly express a plurality of layers and areas, thicknesses may be magnified. Elements having the same function within the scope of the same concept will be described with use of the same reference numeral. Further, throughout the specification, it will be understood that when a part "includes" an element, it may further include another element, not excluding another element, unless otherwise indicated.

In the drawings, an X direction may be defined as a second direction, an L direction, or a length direction, a Y direction may be defined as a third direction, a W direction, or a width direction, and a Z direction may be defined as a first direction, a lamination direction, a T direction, or a thickness direction.

Capacitor Component

Figure 2:
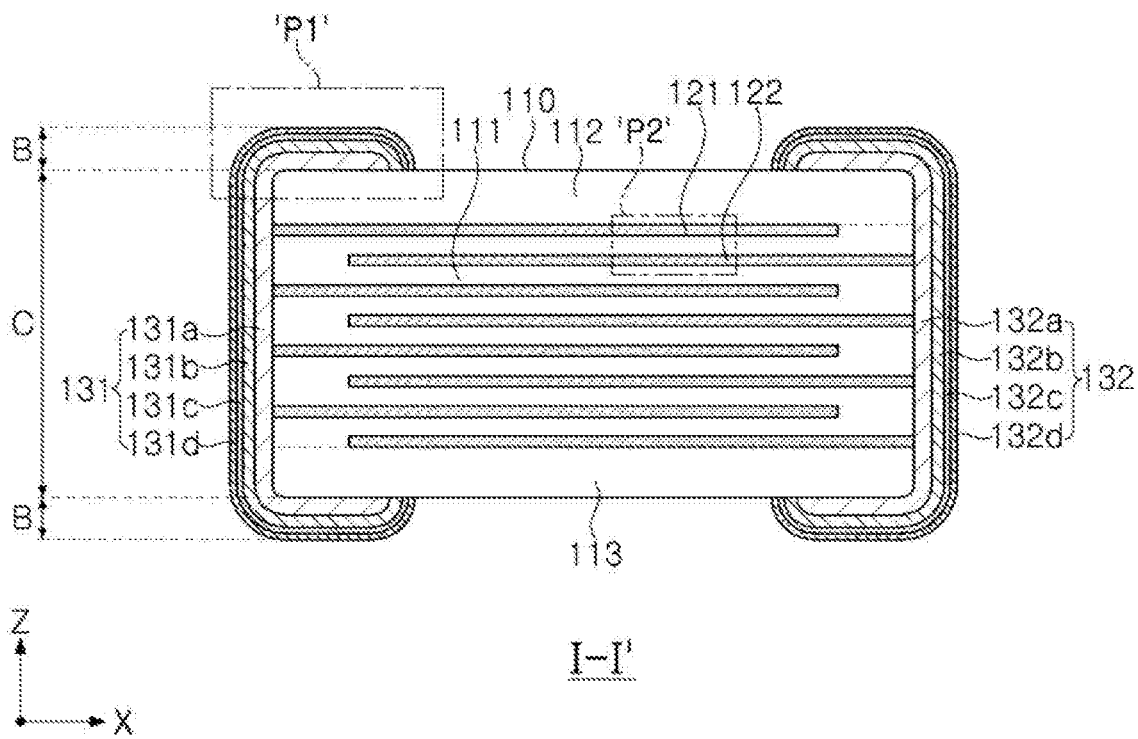
FIG. 2 is a cross-sectional view taken along line I-I' in FIG. 1.
Figure 3:
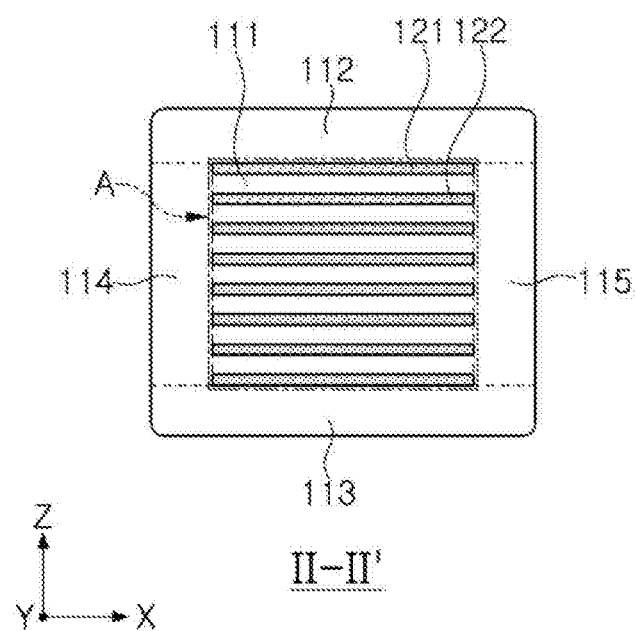
FIG. 3 is a cross-sectional view taken along line II-II' in FIG. 1.
Figure 4A:
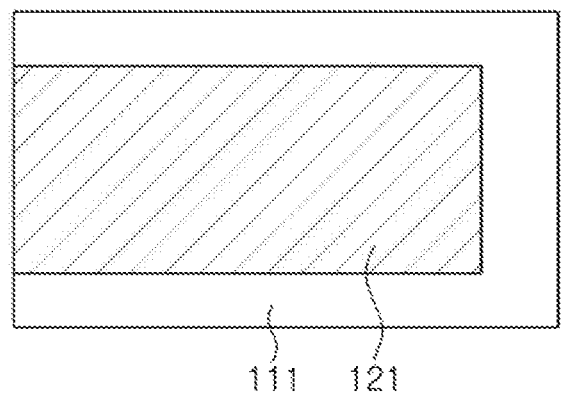
FIG. 4A illustrates a ceramic green sheet on which a first internal electrode is printed.
Figure 4B:
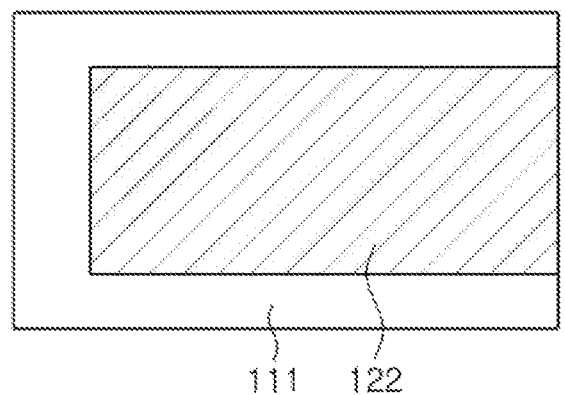
FIG. 4B illustrates a ceramic green sheet on which a second internal electrode is printed.

FIG. 1 is a perspective view of a capacitor component according to an exemplary embodiment. FIG. 2 is a cross-sectional view taken along line I-I' in FIG. 1, and FIG. 3 is a cross-sectional view taken along line II-II' in FIG. 1. FIG. 4A illustrates a ceramic green sheet on which a first internal electrode is printed, and FIG. 4B illustrates a ceramic green sheet on which a second internal electrode is printed.

Hereinafter, a capacitor component 100 according to an exemplary embodiment will be described with reference to FIGS. 1 to 3, 4A, and 4B.

A capacitor component 100 according to an exemplary embodiment includes a body 110 and external electrodes 131 and 132. The body 110 includes a plurality of dielectric layers 111 and first and second internal electrodes 121 and 122 alternately disposed to face each other with respective dielectric layers 111 interposed therebetween, and has first and second surfaces 1 and 2 disposed to oppose each other, third and fourth surfaces 3 and 4 connected to the first and second surfaces 1 and 2 and disposed to oppose each other, and fifth and sixth surfaces 5 and 6 connected to the first to fourth surfaces 1 to 4 and disposed to oppose each other. The external electrodes 131 and 132 are disposed on external surfaces of the body 110, and are connected to the first and second internal electrodes 121 and 122, respectively. The body 110 includes a capacitance forming portion A, in which capacitance is formed by including the first and second internal electrodes 121 and 122 disposed to face and overlap each other with respective dielectric layers 111 interposed therebetween, cover portions 112 and 113 formed above and below the capacitance forming portion A, and margin portions 114 and 115 formed on both side surfaces of the capacitance forming portion A. At least one selected from the cover portions 112 and 113 and the margin portions 114 and 115 includes a plurality of graphene platelets.

The body 110 is formed in such a manner that the dielectric layers 111 and the internal electrodes 121 and 122 are alternately laminated.

A detailed shape of the body 110 is not limited but, as illustrated in the drawings, the body 110 may have a hexahedral shape or a shape similar thereto. Due to contraction of ceramic powder particles included in the body 110 during a sintering procedure, the body 110 may have a substantially hexahedral shape although the hexahedral shape need not have complete straight lines/edges/sides.

The body 110 may have first and second surfaces 1 and 2, disposed to oppose each other in a thickness direction (a Z direction), third and fourth surfaces 3 and 4, connected to the first and second surfaces 1 and 2 and disposed to oppose each other in a length direction (an X direction), and fifth and sixth surfaces 5 and 6 connected to the first and second surfaces 1 and 2 as well as to the third and fourth surfaces 3 and 4 and disposed to oppose each other in a width direction (a Y direction).

The plurality of dielectric layers 111 constituting the ceramic body 110 may be in a sintered state, and adjacent dielectric layers 111 may be integrated with each other so that boundaries therebetween may not be readily apparent without using a scanning electron microscope (SEM).

According to an exemplary embodiment, a material of the dielectric layer 111 is not limited as long as sufficient capacitance is acquirable. The material of the dielectric layer 111 may be, for example, a barium titanate-based material, a lead composite Perovskite-based material, or a strontium titanate-based material.

A material for forming the dielectric layer 111 may be formed by adding various ceramic additives, organic solvents, plasticizers, bonding agents, dispersants, or the like to powder particles such as barium titanate ($BaTiO_3$) according to the objective of the present disclosure.

The plurality of internal electrodes 121 and 122 are disposed to face each other with the dielectric layer 111 interposed therebetween.

The internal electrodes 121 and 122 may include first and second internal electrodes 121 and 122 alternately disposed to face and overlap each other with a dielectric layer interposed therebetween.

The first and second internal electrodes 121 and 122 may be exposed to the third and fourth surfaces 3 and 4 of the body 110, respectively.

Referring to FIG. 2, each internal electrode 121 is spaced apart from the fourth surface 4 and exposed through the third surface 3, and each second internal electrode 122 may be spaced apart from the third surface 3 and exposed through the fourth surface 4. A first external electrode 131 may be disposed on the third surface 3 of the body 110 to be connected to the first internal electrode (s) 121, and a second external electrode 132 may be exposed on the fourth surface 4 of the body 110 to be connected to the second internal electrode(s) 122.

The first and second internal electrodes 121 and 122 may be electrically insulated from each other by the dielectric layer 111 interposed therebetween. The body 110 may be formed by alternately laminating a ceramic green sheet (see FIG. 4A), on which the first internal electrode 121 is printed, and a ceramic green sheet (see FIG. 4B), on which the second internal electrode 122 is printed, in a thickness direction (a Z direction) and sintering the laminated ceramic green sheets.

The conductive paste may be printed using a screen printing method, a Gravure printing method, or the like, but a printing method is not limited thereto.

The capacitor component 100 according to an exemplary embodiment includes a capacitance forming portion A, disposed in the body 110, in which capacitance is formed by including the first internal electrode (s) 121 and the second internal electrode (s) 122 disposed to face and overlap each other with the dielectric layer (s) 111 interposed therebetween, cover portions 112 and 113, disposed above and below the capacitance forming portion A, and margin portions 114 and 115 disposed on both side surfaces of the capacitance forming portion A.

The capacitance forming portion A is a portion contributing to capacitance formation of a capacitor and may be formed by repeatedly laminating a plurality of first and second internal electrodes 121 and 122 with a dielectric layer 111 interposed between each pair of adjacent first and second internal electrodes 121 and 122.

The cover portions 112 and 113 include a top cover portion 112 and a bottom cover portion 113. The top and bottom cover portions 112 and 113 may be formed by vertically laminating a single dielectric layer or two or more dielectric layers on top and bottom surfaces of the capacitance forming portion A, respectively.

The margin portions 114 and 115 include a margin portion 114, disposed on or in contact with the sixth surface 6 of the body 110, and a margin portion 115 disposed on or in contact with the fifth surface 5 of the body 110.

For example, the margin portions 114 and 115 may be disposed on both side surfaces of the body 110 in the width direction.

The cover portions 112 and 113 and the margin portions 114 and 115 may basically serve to prevent damage to internal electrodes, caused by physical or chemical stress, and to maintain reliability of a capacitor component against external impacts.

In the present disclosure, at least one selected from the cover portions 112 and 113 and the margin portions 114 and 115 may include a plurality of graphene platelets. Alternatively, only the margin portions 114 and 115 may include a plurality of graphene platelets. Alternatively, both the cover portions 112 and 113 and the margin portions 114 and 115 may include a plurality of graphene platelets.

Figure 8:
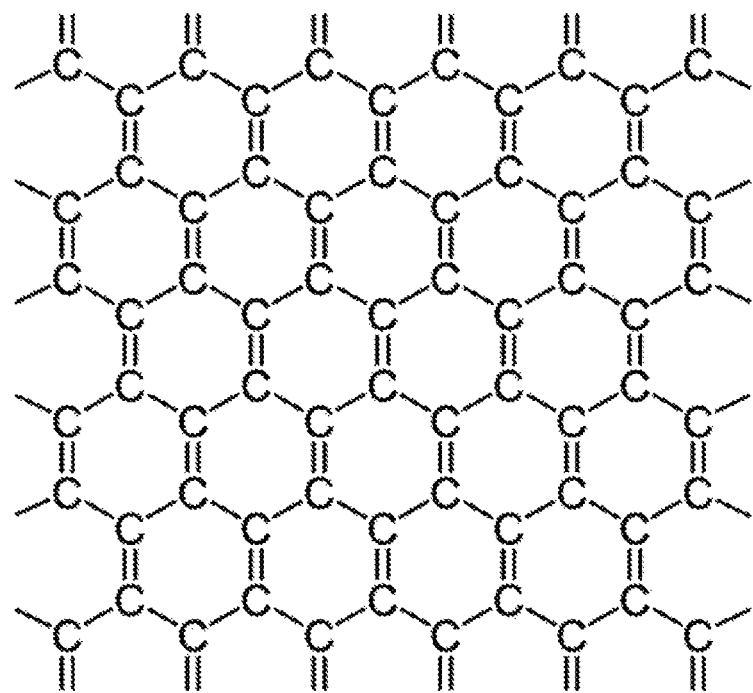
FIG. 8 is a diagram illustratively showing a structural formula of graphene.

FIG. 8 is a diagram illustratively showing a structural formula of graphene.

Referring to FIG. 8, graphene 11c is formed of carbon atoms and is in the form of a thin film having a thickness of a single carbon atom. For example, the graphene 11c has a two-dimensional plate-type structure. Graphene has a thickness of about 0.2 nanometer (nm) and is known to have significantly high physical and chemical stability, a conductivity more than 100 times greater than that of copper (Cu), and a mechanical strength more than 200 times greater than that of steel.

Accordingly, in the present disclosure, a plurality of graphene platelets may be contained in at least one selected from the cover portions 112 and 113 and the margin portions 114 and 115 to improve strength. Moreover, flexural strength as well as mechanical rigidity may be secured and the life of a capacitor component may be improved.

Although graphene is a material having various advantages, a solid content is advantageously decreased to ensure dispersibility as the graphene content of a dielectric composite is increased when slurry for molding a ceramic green sheet molding is prepared. However, this may result in non-uniformity of the ceramic green sheet.

Additionally, when graphene is contained in a dielectric layer included in the capacitance forming portion A, there may be some advantageous effects such as improvement in the dielectric constant and the like. However, since it is difficult to control all graphene platelets to be disposed in desired locations even when the dispersibility is ensured, humidity resistance reliability, a breakdown voltage, or the like may be deteriorated.

In the present disclosure, a plurality of graphene platelets may be contained in at least one selected from the cover portions 112 and 113 and the margin portions 114 and 115 without significantly changing a capacitor manufacturing method according to a related art. In this way, the strength of the body 110 may be improved and a composite of the capacitance forming portion A may be maintained as it is. Thus, the amount of graphene used may be reduced to achieve improved technical accessibility and improved commercial accessibility.

As a result, according to the present disclosure, the capacitance forming portion A may not include graphene. Alternatively, the capacitance forming portion A may have a lower graphene content level than the cover portions 112 and 113 and the margin portions 114 and 115 that contain graphene platelets.

Further, since a binder, an additive, or the like needs to be changed to control the content and locations of graphene platelets contained in the dielectric layers included in the capacitance forming portion A, there is difficulty in using an existing method as it is.

For example, rather than using polyvinyl butyral (PVB)-based binder that is generally used in a dielectric composite, an acrylic binder including an acrylic copolymer-graphene composite may be used to control the content and locations of graphene platelets contained in the dielectric layer included in the capacitance forming portion A.

However, in an exemplary embodiment, no graphene is contained in the capacitance forming portion A, while graphene is contained in at least one selected from the cover portions 112 and 113 and the margin portions 114 and 115. For this reason, a PVB-based binder may be used, and a capacitor component may be manufactured without significantly changing a method according to a related art.

Hereinafter, a case in which a plurality of graphene platelets are contained in the cover portions 112 and 113 will be described. However, the description may be equivalently applied to a case in which a plurality of graphene platelets are contained in the margin portions 114 and 115. Moreover, the description may be equivalently applied to a case in which a plurality of graphene platelets are contained in both the cover portions 112 and 113 and the margin portions 114 and 115.

Figure 5:
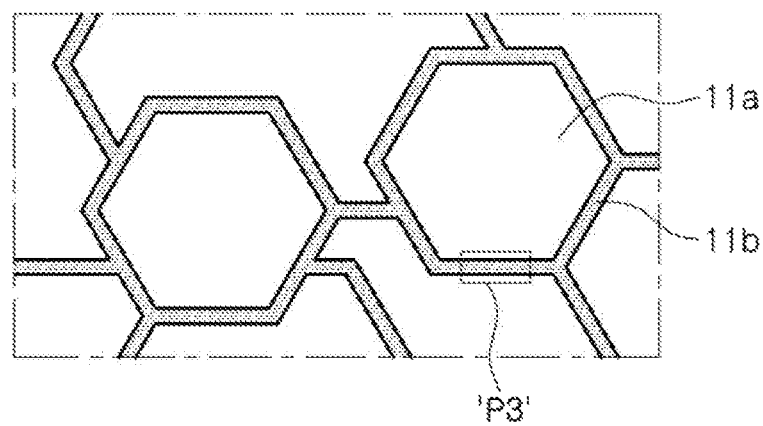
FIG. 5 is a partially enlarged view of a cover portion including graphene platelets.
Figure 6:
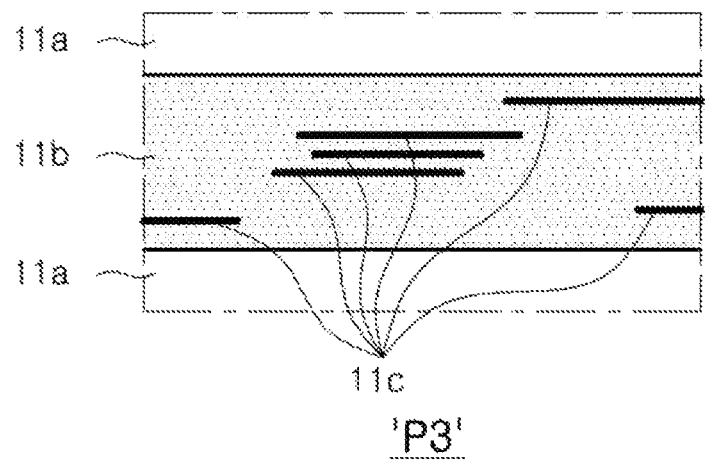
FIG. 6 is an enlarged view of region P3 in FIG. 5.

FIG. 5 is a partially enlarged view of the cover portions 112 and 113 including graphene platelets, and FIG. 6 is an enlarged view of region P3 in FIG. 5.

Referring to FIGS. 5 and 6, the cover portions 112 and 113 may include a plurality of dielectric crystal grains 11a, a grain boundary 11b formed between adjacent dielectric grains 11a, and a plurality of graphene platelets 11c uniformly distributed in grain boundaries 11b.

Figure 7:
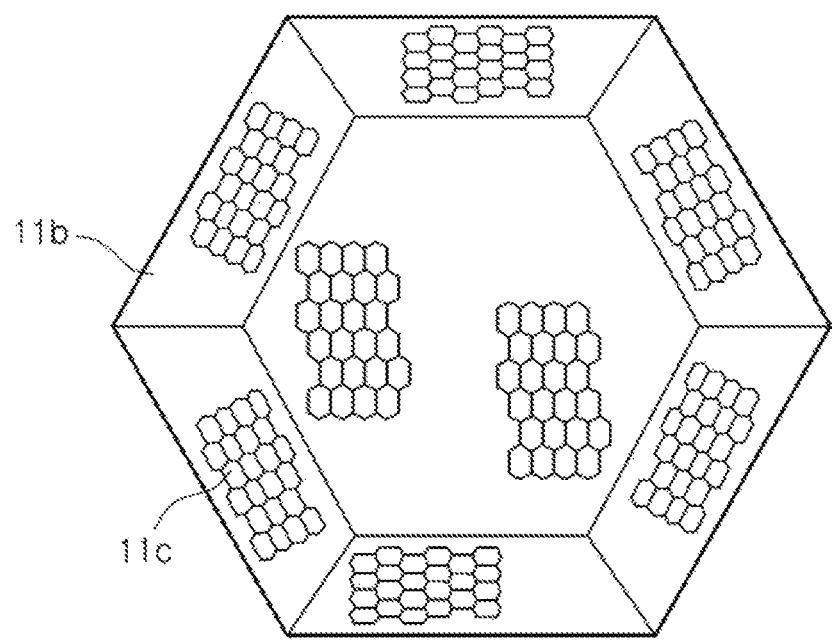
FIG. 7 is a schematic diagram illustrating graphene platelets dispersed in grain boundaries.

FIG. 7 is a schematic diagram illustrating graphene platelets dispersed in grain boundaries. In FIG. 7, grain boundaries are omitted to clarify a distribution form in relation to the dielectric crystal grains 11a, and the dielectric crystal grains 11a are simply shown in a polyhedron to show the top and side surfaces of the polyhedron.

As illustrated in FIG. 7, one surface of the graphene 11c may be disposed along top surfaces and side surfaces of the dielectric grain 11a. For example, one surface of the graphene 11c may be disposed along the surface of the dielectric grain 11a.

Some of the plurality of graphene platelets may exist in a laminated state, but only 5 percent (%) or less of the total graphene platelets may be in the laminated state with 10 or more laminated layers of graphene. This is because when more than 5% of the total graphene platelets is in the laminated state with 10 or more laminated layers of graphene, there is a possibility that dispersibility of graphene is deteriorated to cause a strength improving effect to be non-uniform.

A material for forming the cover portions 112 and 113 including a plurality of graphene platelets may be prepared by adding a plurality of graphene platelets to barium titanate ($BaTiO_3$) powder particles. According to objectives of the present disclosure, various ceramic additives, plasticizers, binders, dispersing agent, and the like may be added thereto.

On the other hand, the content of graphene may be set in consideration of target strength, a size of the capacitor component, and a lamination number, but is limited thereto.

However, the content of graphene contained in the cover portion is, in detail, 0.05 weight percentage (wt %) or more to less than 2.0 wt %, compared with barium titanate (BaTiO$_3$) contained in the cover portion.

When the content of graphene is less than 0.05 wt %, the strength improving effect may be insufficient. When the content of graphene is more than 2.0 wt %, dispersibility of the graphene is deteriorated and viscosity of the graphene is increased during mixture of materials. Accordingly, it is difficult to uniformly distribute graphene platelets.

To uniformly disperse the graphene platelets, a surface of the graphene may be modified such that an instability index of the graphene is controlled to be 0.1 or less. This is because graphene platelets should be applied to slurry in an environment of ethanol-toluene mixed solvent, while they are uniformly dispersed, to obtain graphene platelets uniformly dispersed on a grain boundary after they are sintered.

The instability index is a criterion for evaluating dispersibility, and may be a value measured using a LUMiSizer Dispersion Analyzer.

The external electrodes 131 and 132 are disposed on external surfaces of the body 110 and are connected to the first and second internal electrodes 121 and 122. Similarly to the shape shown in FIG. 2, the external electrodes 131 and 132 may include first and second external electrodes 131 and 132 connected to the first and second internal electrodes 121 and 122, respectively.

The first and second external electrodes 131 and 132 may be electrically connected to the first and second internal electrodes 121 and 122 to form capacitance, respectively. The second external electrode 132 may be connected to a potential different from a potential connected to the first external electrode 131.

The external electrodes 131 and 132 may include electrode layers 131a and 132a and conductive resin layers 131b and 132b disposed on the electrode layers 131a and 132a.

The conductive resin layers 131b and 132b may disperse stress to prevent destruction of a body having low ductility. Accordingly, as described above, a plurality of graphene platelets are included in at least one selected from the cover portions 112 and 113 and the margin portions 114 and 115 to improve strength, and the conductive resin layer 131b and 132b are formed on the external electrodes 131 and 132 to secure not only flexural strength but also mechanical rigidity and to improve the life of the capacitor component.

When the rigidity of the body is increased and the conductive resin layer is applied, reliability of the capacitor body may be further improved.

The external electrodes 131 and 132 may include nickel (Ni) plating layers 131c and 132c disposed on the conductive resin layers 131b and 132b and tin (Sn) plating layers 131d and 132d disposed on the Ni plating layers 131c and 132c.

In the case in which the external electrodes 131 and 132 include a first external electrode 131 and a second external electrode 132, the first external electrode 131 may include a first electrode layer 131a, a first conductive resin layer 131b, a first Ni plating layer 131c, and a first Sn plating layer 131d, and the second external electrode 132 may include a second electrode layer 132a, a second conductive resin layer 132b, a second Ni plating layer 132c, and a second Sn plating layer 132d.

The electrode layers 131a and 132a may include a conductive metal and a glass.

The conductive metal for use in the electrode layers 131a and 132a is not limited as long as it may be electrically connected to the internal electrodes 121, 122 to form capacitance. For example, the conductive metal may be at least one selected from the group consisting of copper (Cu), silver (Ag), Nickel (Ni), and alloys thereof.

The electrode layers 131a and 132a may be formed by applying a conductive paste prepared by adding a glass frit to conductive metal powder particles and sintering the conductive paste.

The conductive resin layers 131b and 132b are disposed on the electrode layers 131a and 132a and may be formed to entirely cover the electrode layers 131a and 132a.

The conductive resin layers 131b and 132b may include a conductive metal and a base resin.

The base resin included in the conductive resin layers 131b and 132b is not limited as long as it has bonding and impact absorbing properties and may be mixed with the conductive metal powder particles to form a paste. For example, the base resin may include an epoxy-based resin.

The conductive metal included in the conductive resin layers 131b and 132b is not limited as long as it may be electrically connected to the electrode layers 131a and 132a. For example, the conductive metal includes at least one selected from the group consisting of copper (Cu), silver (Ag), Nickel (Ni), and alloys thereof.

The Ni plating layers 131c and 132c may be disposed on the conductive resin layers 131b and 132b and may be formed to entirely cover the conductive resin layers 131b and 132b.

The Sn plating layers 131d and 132d may be disposed on the Ni plating layers 131c and 132c and may be formed to entirely cover the Ni plating layers 131c and 132c.

The Sn plating layers 131d and 132d serve to improve mounting characteristics.

The first external electrode 131 may include a connection portion C, disposed on the third surface of the body, and a band portion B extending from the connection portion C to portions of the first and second surfaces. Similarly, the second external electrode 132 may include a connection portion C, disposed on a fourth surface of the body, and a band portion B extending from the connection portion C to portions of the first and second surfaces.

In this case, the band portion B may extend to not only the portions of the first and second surfaces 1 and 2 but also extend to portions of the fifth and sixth surfaces 5 and 6 from the connection portion C.

Figure 11:
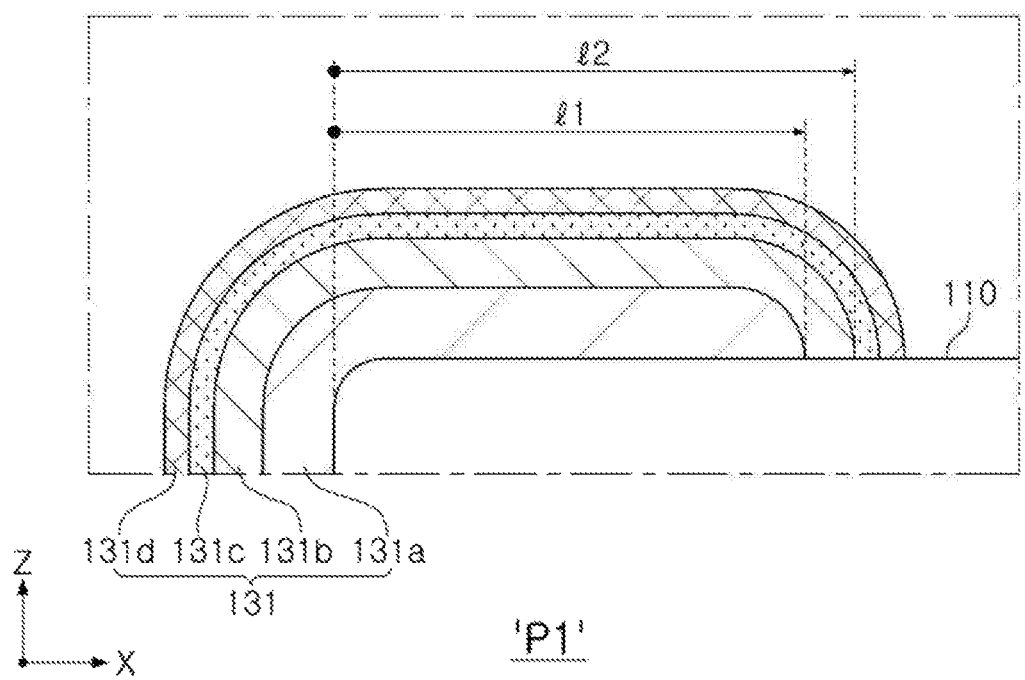
FIG. 11 is an enlarged view of region P1 in FIG. 2.

Referring to FIG. 11, in the first external electrode 131, a distance l1 from the third surface 3 of the body 110 to an end of the band portion B of the first electrode layer 131a may be shorter than a distance l2 from the third surface 3 of the body 110 to an end of the band portion B of the first conductive resin layer 131b.

Similarly, in the second external electrode 132, a distance from the fourth surface 4 of the body 110 to an end of the band portion B of the second electrode layer 132a may be shorter than a distance from the fourth surface 4 of the body 110 to an end of the band portion B of the second conductive resin layer 132b.

Accordingly, the conductive resin layers 131b and 132b may be formed to entirely cover the electrode layers 131a and 132a, and flexural strength characteristics and bonding force between the external electrode and the body may be enhanced.

Figure 12:
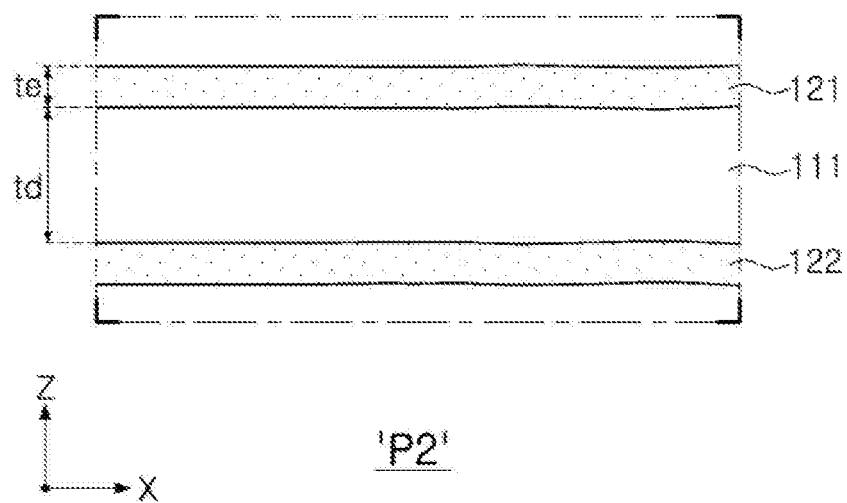
FIG. 12 is an enlarged view of region P2 in FIG. 2.

Referring to FIG. 12, in the capacitor component according to an exemplary embodiment, a thickness td of the dielectric layer 111 and a thickness to of each of the internal electrodes 121 and 122 may satisfy td>2*te.

For example, according to an exemplary embodiment, the thickness td of the dielectric layer 111 is greater than twice the thickness te of each of or either of the internal electrodes 121 and 122.

Generally, a significant issue of an electronic component for a high-voltage electrical component is reliability degradation caused by a decrease in breakdown voltage under a high voltage environment.

In the capacitor component according to an exemplary embodiment, the thickness td of the dielectric layer 111 is greater than twice the thickness te of each of the internal electrodes 121 and 122 to prevent the breakdown voltage from dropping under a high-voltage environment. Thus, a thickness of the dielectric layer 111, which is a distance between adjacent internal electrodes 121 and 122, may be increased to improve dielectric breakdown voltage characteristics.

In the case in which the thickness td of the dielectric layer 111 is less than or equal to twice the thickness te of each of the internal electrodes 121 and 122, the thickness of the dielectric layer 111 is small, and thus, a dielectric breakdown voltage may be decreased.

Each of the internal electrodes may 121 and 122 may have a thickness of 1 micrometer ($\mu$m) or less, and the dielectric layer 111 may have a thickness td less than 2.8 $\mu$m, although the thicknesses thereof are not limited thereto.

Hereinafter, a capacitor component according to another exemplary embodiment will be described in detail. However, the same components as those described above will be omitted to avoid duplicate description.

A capacitor component according to another exemplary embodiment includes a body including a plurality of dielectric layers and first and second internal electrodes, alternately disposed to face each other with respective dielectric layers interposed therebetween, the body having first and second surfaces, disposed to oppose each other, third and fourth surfaces, connected to the first and second surfaces and disposed to oppose each other, and fifth and sixth surfaces connected to the first to fourth surfaces and disposed to oppose each other, and first and second external electrodes disposed on external surfaces of the body and connected to the first and second internal electrodes, respectively. The body includes a capacitance forming portion in which capacitance is formed by including the first and second internal electrodes disposed to face each other with respective dielectric layers interposed therebetween, cover portions disposed above and below the capacitance forming portion, respectively, and margin portions disposed on both side surfaces of the capacitance forming portion, respectively. At least one selected from the cover portions and the margin portions has peaks detected in each of a D-band and a G-band when Raman analysis is performed.

Since graphene has a significantly small size, it may be difficult to clearly observe graphene even when using a transmission electron microscope (TEM) or the like, and it may be difficult to distinguish graphene from other carbon isotopes such as graphite.

Figure 9:
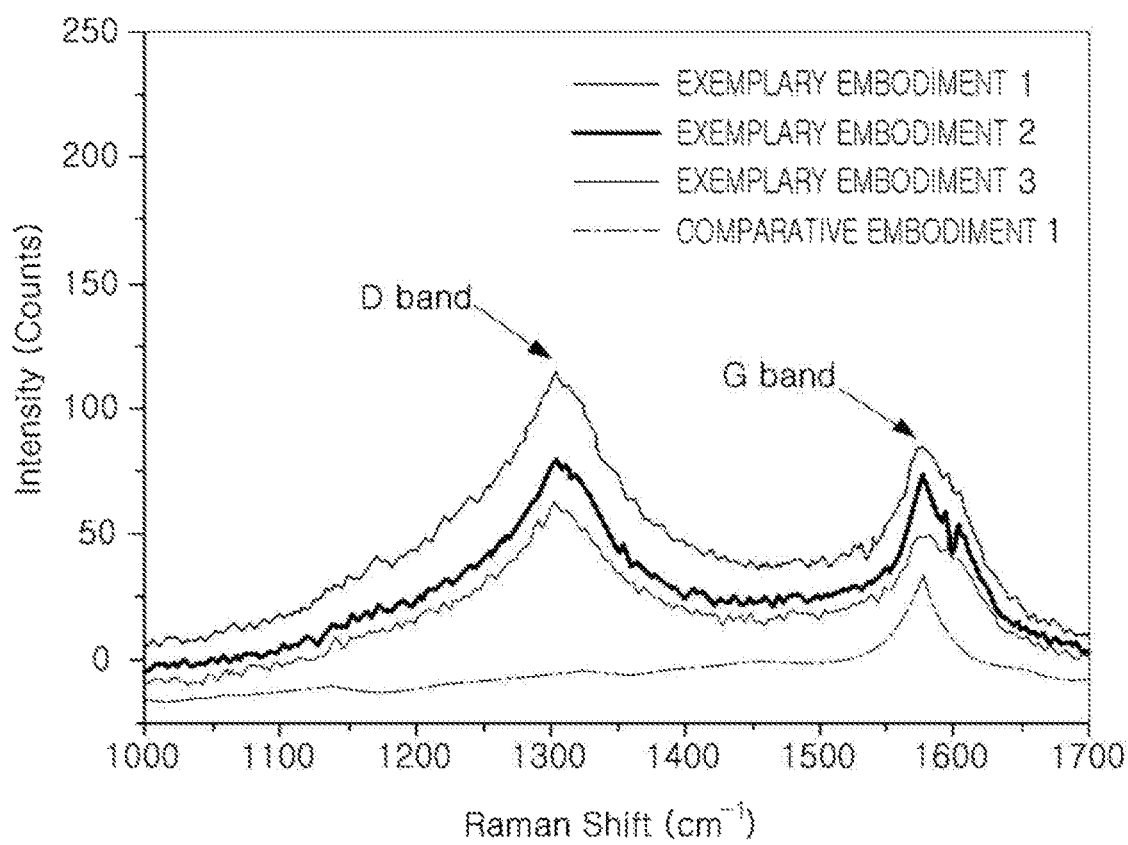
FIG. 9 is a graph illustrating Raman analysis results of a graphene-containing dielectric grain boundary (Exemplary Embodiments 1 to 3) and a graphite-containing dielectric grain boundary (Comparative Embodiment 1)

FIG. 9 is a graph illustrating results obtained by performing a Raman analysis of a graphene-containing dielectric slurry (Exemplary Embodiments 1 to 3) and a graphite-containing dielectric slurry (Comparative Embodiment 1) after annealing the slurries to volatilize organic materials.

Referring to FIG. 9, the graphene-containing dielectric slurry has peaks detected in each of a D-band and a G-band in the Raman analysis.

On the other hand, the graphite-containing dielectric slurry ('graphite' being a carbon isotope of graphene) has a peak detected only in the G-band and not detected in the D-band.

Accordingly, presence or absence of the graphene may be determined and the graphene may be distinguished from another carbon isomer using the Raman analysis method. The capacitor component according to another exemplary embodiment may know that graphene is contained in at least one selected from the cover portions and the margin portions, as a peak is detected in the D-band and the G-band in the Raman analysis of the cover portions and the margin portions.

In the Raman analysis, peaks may not be simultaneously detected in the D-band and G-band of the capacitance forming portion in analyses of other portions of the capacitor component. For example, the capacitance forming portion may not contain graphene.

The D-band can be detected at 1300 $cm^{-1}$ to 1400 $cm^{-1}$, and the G-band can be detected at 1500 $cm^{-1}$ to 1600 $cm^{-1}$.

Figure 10:
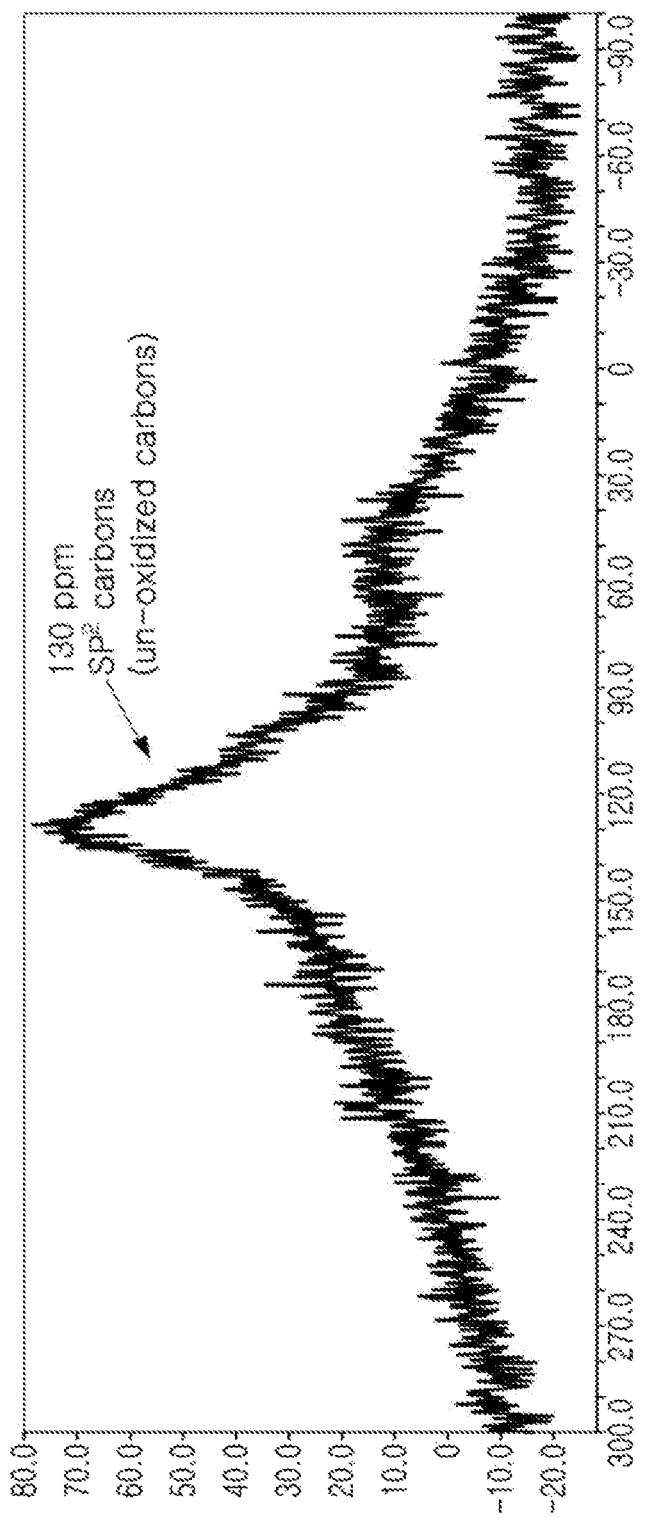
FIG. 10 is graph illustrating a nuclear magnetic resonance spectroscopy analysis result of a graphene-containing dielectric grain boundary.

FIG. 10 is graph illustrating a nuclear magnetic resonance (NMR) spectroscopy analysis result of a graphene-containing dielectric material.

In FIG. 10, an X-axis represents a chemical shift, and a Y-axis represents intensity. The intensity is detected differently depending on a functional group of carbon.

Referring to FIG. 10, since a pure C-bond has a peak detected at 120 ppm to 140 ppm, the presence of graphene may be confirmed as the peak is detected at 120 ppm to 140 ppm.

Moreover, since some of a plurality of graphene platelets of the present disclosure may include an oxidized region, it may be confirmed that a weak peak is also detected in a region of 50 ppm to 80 ppm that is a C—O bond region.

For example, some of the plurality of graphene platelets of the present invention may be a graphene oxide (GO) or a reduced graphene oxide (RGO).

As described above, a capacitor component according to an exemplary embodiment includes cover portions and margin portions. At least one of the cover portions and the margin portions include a plurality of graphene platelets to efficiently secure high strength. Moreover, not only flexural strength but also mechanical rigidity may be secured, and the life of the capacitor component may be improved.

While exemplary embodiments have been shown and described above, it will be apparent to those skilled in the art that modifications and variations could be made without departing from the scope of the present invention as defined by the appended claims.

What is claimed is:

1. A capacitor component comprising:
   a body including a plurality of dielectric layers and first and second internal electrodes, alternately disposed to face each other with respective dielectric layers interposed therebetween, the body having first and second surfaces, disposed to oppose each other, third and fourth surfaces, connected to the first and second surfaces and disposed to oppose each other, and fifth and sixth surfaces connected to the first, second, third, and fourth surfaces and disposed to oppose each other; and
   first and second external electrodes disposed on external surfaces of the body and connected to the first and second internal electrodes, respectively,
   wherein the body includes a capacitance forming portion, in which capacitance is formed by including the first and second internal electrodes disposed to face each other with respective dielectric layers interposed therebetween, cover portions disposed above and below the capacitance forming portion in a stacking direction of the first and second internal electrodes, and margin portions disposed on opposite sides of the capacitance forming portion,
at least one selected from the cover portions and the margin portions includes a plurality of graphene platelets,
the capacitance forming portion does not include graphene or has a lower graphene content than the at least one selected from the cover portions and the margin portions, and
each of the first and second external electrodes includes an electrode layer and a conductive resin layer disposed on the electrode layer.

2. The capacitor component of claim 1, wherein the at least one selected from the cover portions and the margin portions includes a plurality of dielectric grains and grain boundaries disposed between adjacent dielectric grains, and
the plurality of graphene platelets are disposed in the grain boundaries.

3. The capacitor component of claim 2, wherein the graphene platelets have one surface disposed along surfaces of the plurality of dielectric grains.

4. The capacitor component of claim 2, wherein among the plurality of graphene platelets, 5 percent or less of the total graphene platelets are in a laminated state with 10 or more laminated layers of graphene.

5. The capacitor component of claim 1, wherein the content of the plurality of graphene platelets in the at least one selected from the cover portions and the margin portions is 0.05 weight percentage (wt %) or more to less than 2.0 wt %, compared with barium titanate ($BaTiO_3$) contained in the at least one selected from the cover portions and the margin portions.

6. The capacitor component of claim 1, wherein the at least one selected from the cover portions and the margin portions has peaks in a Raman analysis detected in each of a D-band and a G-band.

7. The capacitor component of claim 1, wherein the capacitance forming portion has a peak in a Raman analysis which is detected in only one from among a D-band and a G-band.

8. The capacitor component of claim 1, wherein some of the plurality of graphene platelets are a graphene oxide or a reduced graphene oxide.

9. The capacitor component of claim 1, wherein each of the first and second internal electrodes has a thickness less than 1 micrometer, and each of the dielectric layers has a thickness less than 2.8 micrometers.

10. The capacitor component of claim 1, wherein when a thickness of each of the internal electrodes is defined as te and a thickness of each of the dielectric layers is defined as td, te and td satisfy td>2*te.

11. The capacitor component of claim 1, wherein the first external electrode is disposed on the third surface and includes a band portion extending onto portions of the first and second surfaces, and
a distance from the third surface to an end of the band portion of the electrode layer is shorter than a distance from the third surface to an end of the band portion of the conductive resin layer.

12. A capacitor component comprising:
a body including a plurality of dielectric layers and first and second internal electrodes, alternately disposed to face each other with respective dielectric layers interposed therebetween, the body having first and second surfaces, disposed to oppose each other, third and fourth surfaces, connected to the first and second surfaces and disposed to oppose each other, and fifth and sixth surfaces connected to the first, second, third, and fourth surfaces and disposed to oppose each other; and
first and second external electrodes disposed on external surfaces of the body and connected to the first and second internal electrodes, respectively,
wherein the body includes a capacitance forming portion, in which capacitance is formed by including the first and second internal electrodes disposed to face each other with respective dielectric layers interposed therebetween, cover portions disposed above and below the capacitance forming portion in a stacking direction of the first and second internal electrodes, and margin portions disposed on opposite sides of the capacitance forming portion,
at least one selected from the cover portions and the margin portions has peaks detected in each of a D-band and a G-band in Raman analysis, and
when a thickness of each of the internal electrodes is defined as te and a thickness of each of the dielectric layers is defined as td, te and td satisfy td>2*te.

13. The capacitor component of claim 12, wherein the capacitance forming portion has a peak which is detected in only one from among the D-band and the G-band in Raman analysis.

14. The capacitor component of claim 12, wherein the at least one selected from the cover portions and the margin portions includes a plurality of dielectric grains and a grain boundary formed between adjacent dielectric grains, and
the grain boundary has a peak detected in a Raman analysis in the D-band and the G-band.

15. The capacitor component of claim 12, wherein the D-band is at 1300 $cm^{-1}$ to 1400 $cm^{-1}$, and
the G-band is at 1500 $cm^{-1}$ to 1600 $cm^{-1}$.

16. The capacitor component of claim 12, wherein the at least one selected from the cover portions and the margin portions has a peak detected at 120 ppm to 140 ppm in a nuclear magnetic resonance (NMR) spectroscopy analysis.

17. The capacitor component of claim 12, wherein the at least one selected from the cover portions and the margin portions includes a plurality of graphene platelets, and
some of the plurality of graphene platelets are a graphene oxide or a reduced graphene oxide.

18. The capacitor component of claim 12, wherein each of the first and second external electrodes includes an electrode layer and a conductive resin layer disposed on the electrode layer,
the electrode layer includes a glass and a conductive metal including at least one selected from the group consisting of copper (Cu), silver (Ag), nickel (Ni), and alloys thereof, and
the conductive resin layer includes a base resin and a conductive metal including at least one selected from the group consisting of copper (Cu), silver (Ag), nickel (Ni), and alloys thereof.

* * * * *